United States Patent [19]

Flotow

[11] Patent Number: 4,936,432
[45] Date of Patent: Jun. 26, 1990

[54] INTERNAL ASSISTED CLUTCH COMPONENTS AND ASSEMBLY

[75] Inventor: Richard Flotow, Butler, Ind.

[73] Assignee: Dana Corporation, Toledo, Ohio

[21] Appl. No.: 150,794

[22] Filed: Feb. 1, 1988

Related U.S. Application Data

[63] Continuation-in-part of Ser. No. 48,250, May 11, 1987, Pat. No. 4,760,906.

[51] Int. Cl.$^5$ .................. F16D 13/44; F16D 23/14
[52] U.S. Cl. ...................... 192/89 R; 192/70.3; 192/98; 192/99 A
[58] Field of Search .................. 192/70.3, 98, 99 A, 192/89 R, 70.27

[56] References Cited

U.S. PATENT DOCUMENTS

| | | |
|---|---|---|
| 274,715 | 3/1983 | Buckley . |
| 933,433 | 2/1911 | Friddle ............... 192/89 R X |
| 1,197,245 | 9/1916 | White ............... 192/99 A X |
| 1,839,959 | 1/1932 | Gamble ............... 192/70.3 |
| 1,867,723 | 7/1932 | Adams . |
| 1,897,411 | 2/1933 | Adams . |
| 1,923,435 | 8/1933 | Gilpin . |
| 1,965,402 | 7/1934 | Adelmann . |
| 2,037,451 | 4/1936 | Beringer . |
| 2,067,970 | 1/1937 | Laszlo . |
| 2,280,357 | 4/1942 | Spase . |
| 2,400,586 | 5/1946 | Zimmerman . |
| 2,431,928 | 12/1947 | Garreau . |
| 2,562,613 | 7/1951 | Halberg . |
| 2,765,892 | 10/1956 | Reed . |
| 3,162,286 | 12/1964 | Smith et al. . |
| 3,276,555 | 10/1966 | Phelps et al. . |
| 3,394,788 | 7/1968 | Sink . |
| 3,667,582 | 6/1972 | Borck et al. ............... 192/99 A |
| 3,670,859 | 6/1972 | Schiefer et al. ............... 192/99 A X |
| 3,752,286 | 8/1973 | Sink ............... 192/111 A |
| 4,034,836 | 7/1977 | Sink et al. ............... 192/99 A |
| 4,157,749 | 6/1979 | Sink et al. ............... 192/99 A |
| 4,285,424 | 8/1981 | Sink et al. ............... 192/111 B |
| 4,332,314 | 6/1982 | Flotow ............... 192/89 B |
| 4,754,860 | 7/1988 | Fukutake et al. ............... 192/70.3 X |
| 4,760,906 | 8/1988 | Flotow et al. ............... 192/70.25 |

Primary Examiner—Rodney H. Bonck
Attorney, Agent, or Firm—MacMillan, Sobanski & Todd

[57] ABSTRACT

A clutch cover assembly includes a cover which is formed as a one piece casting. A plurality of engagement spring seats and a plurality of assister spring seats are provided on the cover. The engagement and assister spring seats are all formed integrally with the cover and includes portions having generally V-shaped cross sections. The assembly further includes a release sleeve which is also formed as a one piece casting. A plurality of engagement spring seats and a plurality of assister spring seats are also provided on the release sleeve. The engagement and assister spring seats are all formed integrally with the release sleeve and includes portions having generally V-shaped cross sections. The engagement spring seats on the cover and the release sleeve are provided to pivotably pilot engagement springs for the clutch, while the assister spring seats on the cover and the release sleeve are provided to pivotably pilot assister springs. The engagement springs each have a generally oval shape throughout most of the length thereof.

16 Claims, 3 Drawing Sheets

४,९३६,४३२

INTERNAL ASSISTED CLUTCH COMPONENTS AND ASSEMBLY

CROSS REFERENCE TO RELATED APPLICATION

This application is a continuation-in-part of co-pending application Ser. No. 07/048,250, filed May 11, 1987, now U.S. Pat. No. 4,760,906, and owned by the assignee of the present application.

BACKGROUND OF THE INVENTION

The present invention relates in general to clutches and in particular to several improved components for an internal assisted clutch, as well as the overall assembly thereof.

Clutches are well known devices which are adapted to selectively connect a driving input member to a driven output member, typically for rotation together in a vehicle. Within such clutches, a plurality of springs is frequently used to urge the components of clutch toward an engaged position, wherein the input member frictionally engages the driven output member. The force generated by these springs is generally large in magnitude, requiring a relatively large effort by an operator of the vehicle to overcome the urging thereof and disengage the clutch.

In the past, assister devices have been provided within such clutches to reduce the amount of effort required to move the components of the clutch from the engaged position to the disengaged position. Many of such prior devices have been located outside of the clutch cover assembly, thereby exposing them to damage. Also, many of such prior devices are complicated in structure and operation. Consequently, the known assister devices are expensive and subject to premature failure because of the excessive number of parts.

SUMMARY OF THE INVENTION

The present invention relates to several improved components for an internal assisted clutch cover assembly, as well as the overall assembly thereof. The clutch cover assembly includes a cover which is generally annular in shape and is formed as a one piece casting. A plurality of engagement spring seats are provided on the cover. The engagement spring seats are oriented so as to face radially inwardly and axially forwardly at an angle relative to a central longitudinal axis of rotation defined by the cover and the assembly. A plurality of assister spring seats are also provided on the cover. The assister spring seats are oriented so as to face radially inwardly toward the axis of rotation. The engagement spring seats and the assister spring seats are all formed integrally with the cover. The assembly further includes a release sleeve which is generally hollow and cylindrical in shape. The release sleeve is also formed as a one piece casting. A plurality of engagement spring seats are provided on the release sleeve. The engagement spring seats are oriented so as to face radially outwardly and axially rearwardly at an angle relative to the axis of rotation toward the engagement spring seats formed on the cover. A plurality of assister spring seats are also provided on the release sleeve. The assister spring seats are oriented so as to face radially outwardly from the axis of rotation toward the assister spring seats formed on the cover. The engagement spring seats on the cover and the release sleeve are provided to pilot engagement springs for the assembly, while the assister spring seats on the cover and the release sleeve are provided to pilot assister springs. The engagement springs each have a generally oval shape throughout most of the length thereof.

It is an object of the present invention to provide an improved structure for several individual components within an internal assisted clutch.

It is another object of the present invention to provide an improved assembly for such an internal assisted clutch.

It is a further object of the present invention to provide such an internal assisted clutch which uses a plurality of oval shaped engagement springs to urge the components of the clutch toward an engaged position.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Figure 1:
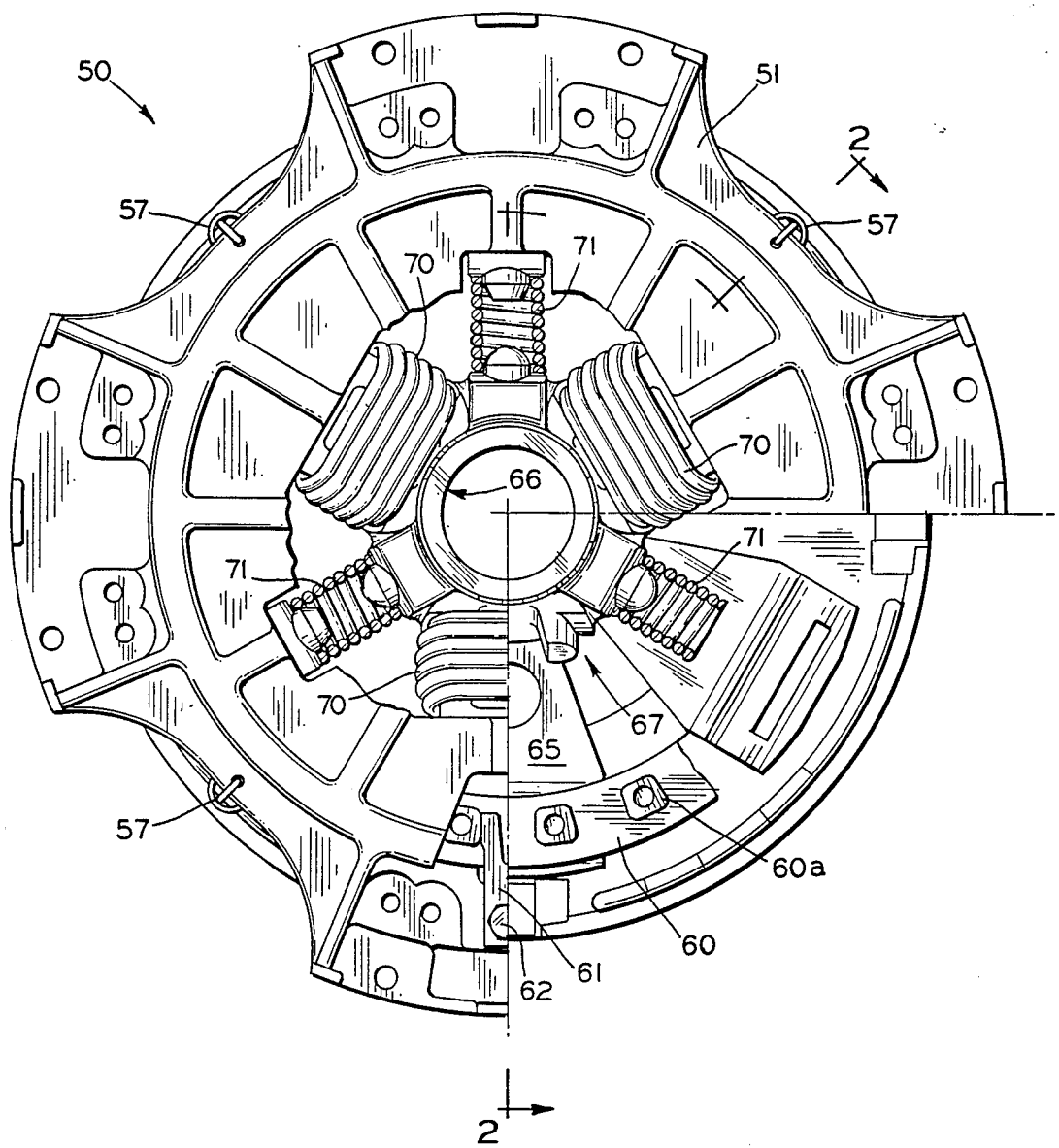
FIG. 1 is an end elevational view of a clutch cover assembly in accordance with the present invention, a portion thereof being omitted for clarity to reveal the relationship of the internal components of the assembly.
Figure 2:
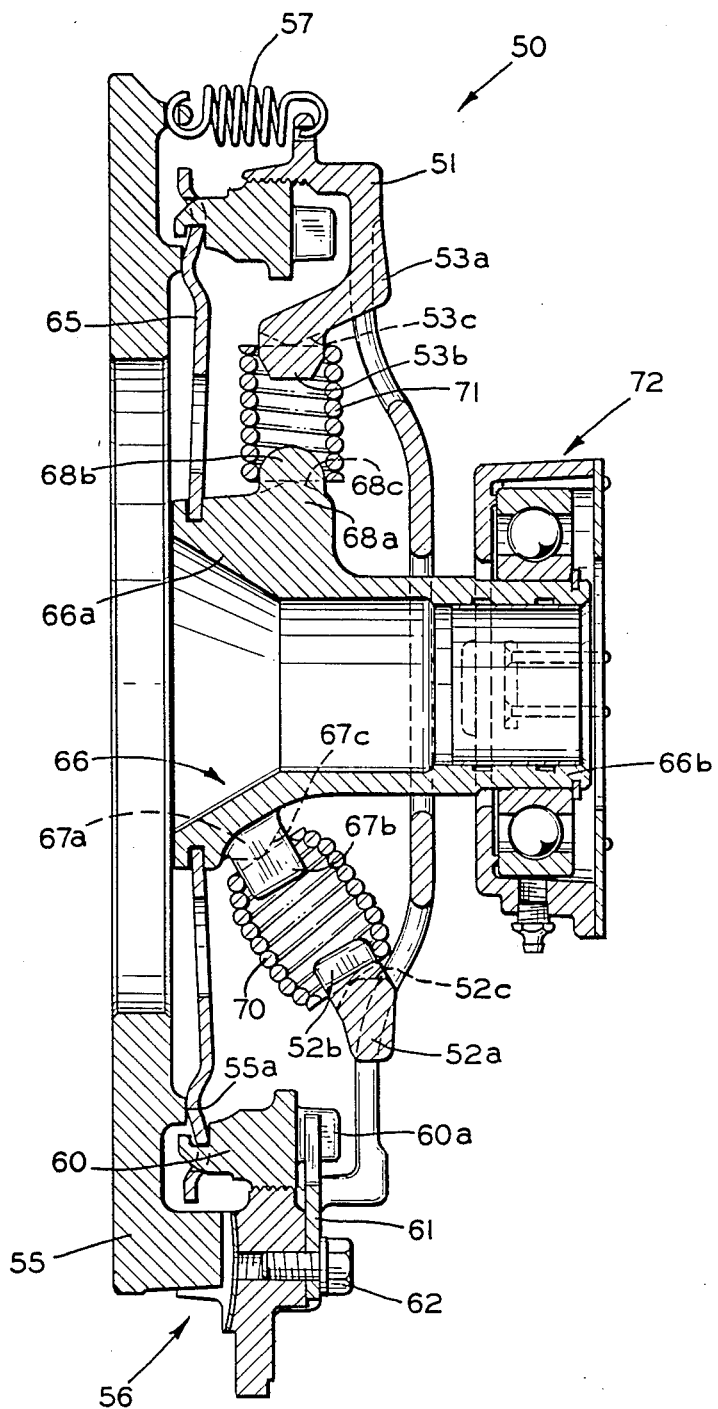
FIG. 2 is a sectional elevational view taken along line 2—2 of FIG. 1 showing the components of the clutch cover in an engaged position.

Referring now to the drawings, there is illustrated in FIGS. 1 and 2 a clutch cover assembly, indicated generally at 50, in accordance with the present invention. The assembly 50 includes a cover 51 which is adapted to be connected to a flywheel (not shown) in a conventional manner for rotation therewith about a longitudinal axis. The entire cover 51 is formed from a single piece of material, such as iron by casting. The structure of the clutch cover 51 is illustrated in greater detail in FIGS. 3 through 5. As shown therein, the main body of the cover 51 is generally annular in shape and includes a plurality of engagement spring seats, indicated generally at 52. Each of the engagement spring seats 52 is formed by a seat portion 52a having a pair of upstanding ear portions 52b formed thereon. The seat portions 52a are formed integrally (i.e., from the same piece of material) with the cover 51.

Figure 3:
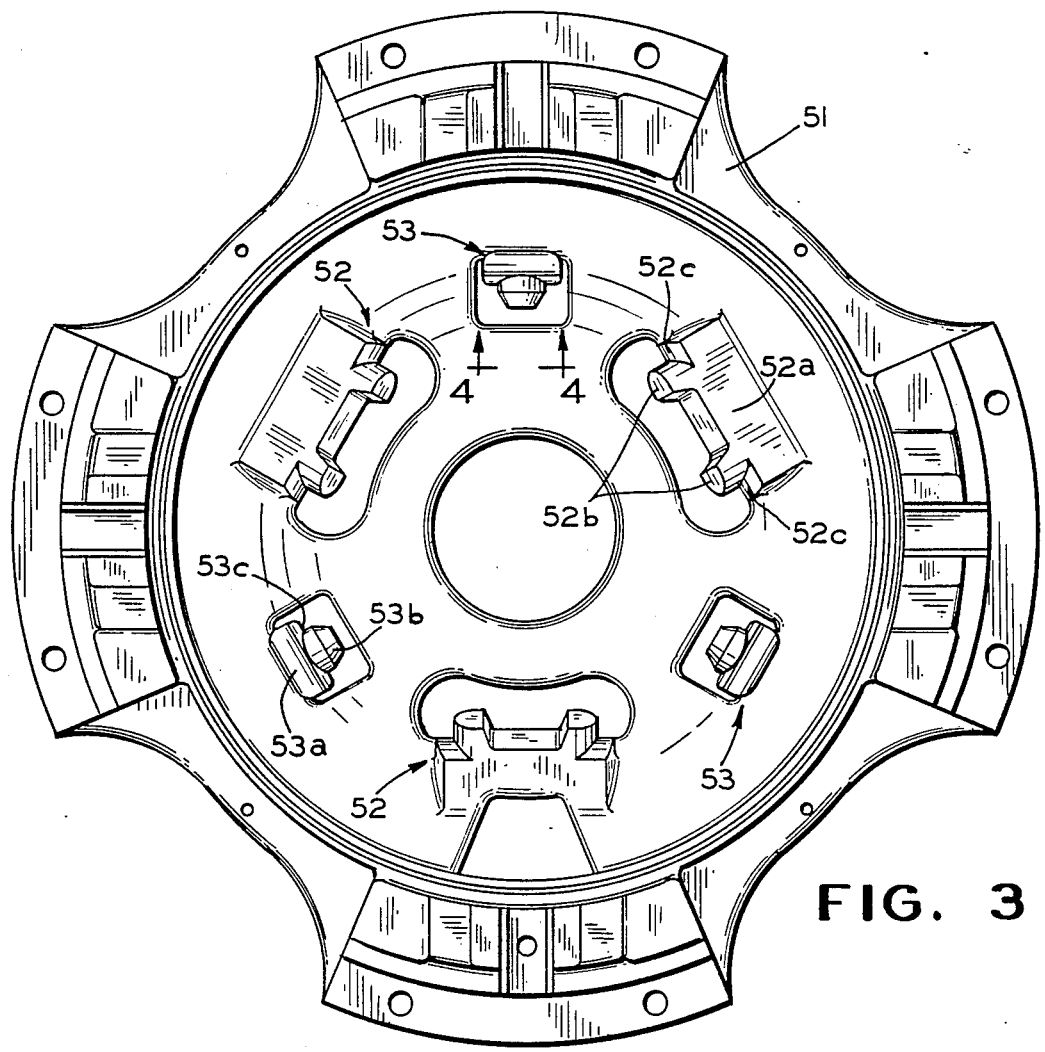
FIG. 3 is an end elevational view, taken in the opposite direction from FIG. 1, of the inside of the cover of the cover illustrated in FIGS. 1 and 2.
Figure 4:
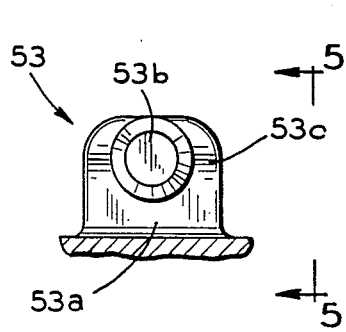
FIG. 4 is a fragmentary sectional elevational view taken along line 4—4 of FIG. 3.

The seat portions 52a are elongated in shape and are oriented perpendicularly relative to a bisecting radius of the cover 51 extending therethrough. The seat portions 52a extend radially inwardly and axially forwardly from the cover 51 at an angle relative to the axis of rotation of the assembly 50. Each of the seat portions 52a terminates in an inwardly facing surface 52c, which is best shown in FIGS. 2 and 3. As illustrated therein, the inwardly facing surfaces 52c are not flat, but rather have a generally V-shaped cross section so as to define a pivot line thereacross. The ear portions 52b are formed integrally with the seat portions 52a and extend further inwardly and forwardly from each of the inwardly facing surfaces 52c at an angle relative to the axis of rotation. The ear portions 52b are spaced apart from one another. The portion of the inwardly facing surface 52c extending between the ear portions 52b may be V-shaped as described above or may be flat as illustrated. Alternatively, a single ear portion (not shown) extending across the central portion of the inwardly facing surface 52c may be provided in lieu of the two separate ear portions 52b for each of the engagement spring seats 52.

Figure 5:
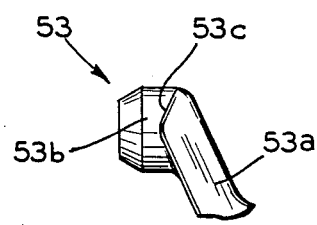
FIG. 5 is a fragmentary sectional elevational view taken along 5—5 of FIG. 4.

The cover 51 further includes a plurality of assister spring seats, indicated generally at 53. Each of the assister spring seats 53 is formed by an arm portion 53a having a button portion 53b formed thereon. The arm portions 53a are formed integrally with the cover 51. The arm portions 53a extend inwardly and forwardly from the cover 51 at an angle with respect to the axis of rotation of the assembly 50. Each of the arm portions 53a terminates in an inwardly facing surface 53c, which is best shown in FIGS. 2 and 5. As illustrated therein, the inwardly facing surfaces 53c are not flat, but rather have a generally V-shaped cross section so as to define a pivot line thereacross. The button portions 53b are formed integrally with the seat portions 53a and extend radially inwardly from the inner surfaces 53c at a right angle relative to the axis of rotation.

An annular pressure plate 55 is connected to the cover 51 by means of a plurality of spaced lug and slot arrangements, indicated generally at 56 in FIG. 2. The lug and slot arrangements 56 are conventional in the art and are provided to permit the cover 51 to rotatably drive the pressure plate 55, while allowing the pressure plate 51 to move axially relative to the cover 51, as is well known in the art. The pressure plate 55 is urged toward the cover 51 by a plurality of return springs 57 disposed about the periphery of the assembly 50. An annular shoulder 55a is formed about the pressure plate 55 facing toward the cover 51.

The clutch cover assembly 50 may include an adjusting ring, as shown at 60 in FIGS. 1 and 2. The adjusting ring 60 is conventional in the art and includes an outer threaded surface which is adapted to cooperate with an inner threaded surface formed on the cover 51. Rotation of the adjusting ring 60 relative to the cover 51 causes axial movement of the adjusting ring 60. The illustrated adjusting ring 60 is of the manual type, including a plurality of upstanding lugs 60a formed thereon. A lock strap 61 is secured to the cover 51 by a bolt 62 to maintain the adjusting ring 60 in a desired rotational position relative to the cover 51. The structure and operation of the manual adjusting ring 60 is described more fully in U.S. Pat. No. 4,285,424, the disclosure of which is incorporated herein by reference. If desired, an automatic adjusting ring (not shown) may be used instead of the manual adjusting ring 60. The structure and operation of the automatic adjusting ring is described more fully in U.S. Pat. No. 3,752,286, the disclosure of which is also incorporated herein by reference. Lastly, the clutch cover assembly 50 may be of the non-adjustable type, wherein no adjusting ring is provided. The structure and operation of the non-adjustable clutch cover assembly is described more fully in U.S. Pat. No. 4,332,314, the disclosure of which is also incorporated herein by reference.

A plurality of conventional levers 65 are provided within the clutch cover assembly 50. The levers 65 extend generally radially outwardly from the axis of rotation and are spaced equidistantly thereabout. The outermost ends of the levers 65 have slots formed therethrough to receive respective projections formed on the adjusting ring 60. The innermost ends of the levers 65 are engaged in a peripheral groove formed in a release sleeve, indicated generally at 66. The release sleeve 66 is disposed co-axially about the axis of rotation and is permitted to move a limited distance therealong. The structure of the release sleeve 66 is described in greater detail below. Between their outermost and innermost ends, the levers 65 engage the annular shoulder 55a of the pressure plate 55. As is well known in the art, axial movement of the release sleeve 66 causes the levers 65 to pivot about the projections of the adjusting ring 60, thereby causing axial movement of the pressure plate 55.

Figure 6:
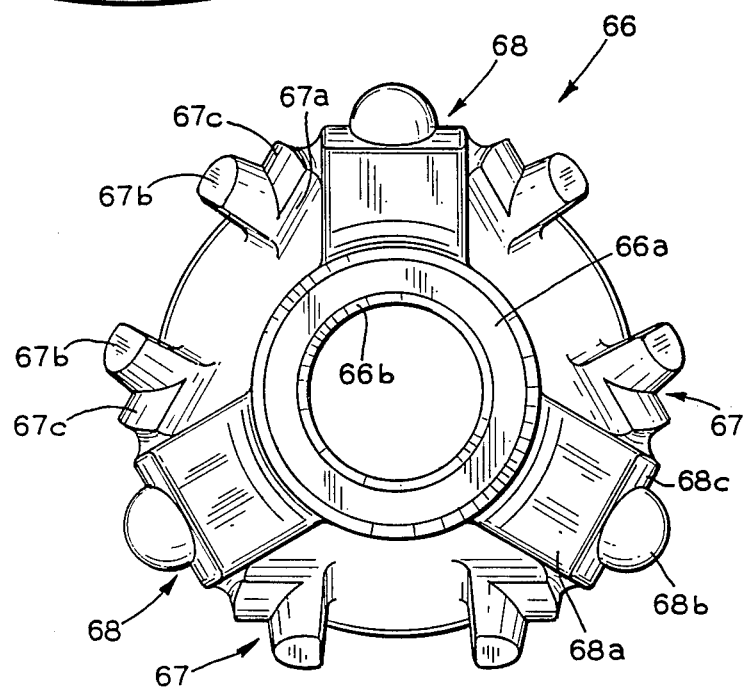
FIG. 6 is an end elevational view, taken in the same direction as FIG. 1, of the release sleeve of the cover assembly.

The structure of the release sleeve 66 is best shown in FIGS. 2 and 6. As illustrated therein, the release sleeve 66 is generally elongated and cylindrical in shape. The entire release sleeve 66 is formed from a single piece of material, such as iron by casting, and includes a first end portion 66a, which is located within the clutch cover assembly 50, and a second end portion 66b, which extends outside of the assembly 50. The first end portion 66a is generally annular in shape and includes a plurality of engagement spring seats, indicated generally at 67. Each of the engagement spring seats 67 is formed by a seat portion 67a having a pair of upstanding ear portions 67b formed thereon. The seat portions 67a are formed integrally with the release sleeve 66.

The seat portions 67a are elongated in shape and are oriented perpendicularly relative to a bisecting radius of the release sleeve 66 extending therethrough. The seat portions 67a extend radially outwardly and axially rearwardly from the first end portion 66a at an angle relative to the axis of rotation. Each of the seat portions 67a terminates in an outwardly facing surface 67c, which is best illustrated in FIG. 6. As shown therein, the outwardly facing surfaces 67c are not flat, but rather have a generally V-shaped cross section so as to define a pivot line thereacross. The ear portions 67b are formed integrally with the seat portions 67a and extend further outwardly and rearwardly from the outwardly facing surfaces 67c at an angle relative to the axis of rotation. The ear portions 67c are spaced apart from one another. The portion of the outwardly facing surface 67c extending between the ear portions 67b may be V-shaped as described above or may be flat as illustrated. Alternatively, a single ear portion (not shown) extending across the outwardly facing surface 67c may be provided in lieu of the two separate ear portions 67b for each of the engagement spring seats 67.

The release sleeve 66 further includes a plurality of assister spring seats, indicated generally at 68. Each of the assister spring seats 68 is formed by an arm portion 68a having a button portion 68b formed thereon. The arm portions 68a are formed integrally with the release sleeve 66. The arm portions 68a extend outwardly from the release sleeve 66 at a right angle relative to the axis of rotation. Each of the arm portions 68a terminates in an outwardly facing surface 68c, which is best shown in FIG. 2. As illustrated therein, the outwardly facing surfaces 68c are not flat, but rather have a generally V-shaped cross section so as to define a pivot line thereacross. The button portions 68b are formed integrally with the seat portions 68a and extend radially outwardly from the outwardly facing surfaces 68c at a right angle relative to the axis of rotation.

A single engagement spring 70 is supported between each of the engagement spring seats 52 formed on the cover 51 and its corresponding engagement spring seat 67 formed on the release sleeve 66. As best shown in FIG. 1, each of the engagement springs 70 has a plurality of coils throughout the length thereof. Each of the coils is generally oval in shape and has a predetermined size. However, the coils which form the ends of the springs 70 may be slightly smaller in shape than the coils which form the central portions thereof. The ends of the engagement springs 70 are adapted to enclose the ear portions 52b and 67b of the engagement spring seats 52 and 67, respectively, so as to engage the inwardly facing and outwardly facing surfaces 52c and 67c thereof. The pivot lines defined on the inwardly facing and outwardly facing surfaces 52c and 67c of the engagement spring seats 52 and 67 permit the engagement springs 70 to pivot slightly as the release sleeve 66 is moved axially, as described above.

A single assister spring 71 is supported between each of the assister spring seats 53 formed on the cover 51 and its corresponding assister spring seat 68 formed on the release sleeve 66. As best shown in FIG. 1, each of the assister springs 70 is generally circular in shape throughout the length thereof. The ends of the assister springs 71 are adapted to enclose the button portions 53b and 68b of the assister spring seats 53 and 68, respectively, so as to engage the inwardly facing and outwardly facing surfaces 53c and 68c thereof. The pivot lines defined on the inwardly facing and outwardly facing surfaces 53c and 68c of the assister spring seats 53 and 68 permit the assister springs 71 to pivot slightly as the release sleeve 66 is moved axially, as described above.

A conventional throw-out bearing assembly 72 is secured to the release sleeve 66 for axial movement therewith, while permitting relative rotational movement. The bearing assembly 72 is adapted to be axially moved by a conventional linkage (not shown) so as to selectively move the components of the assembly 50 between engaged and disengaged positions. The operation of the assembly is substantially the same as set forth in the above-referenced co-pending application.

In accordance with the provisions of the patent statutes, the principle and mode of operation of the present invention have been explained and illustrated in its preferred embodiment. However, it must be understood that the present invention may be practiced otherwise than as specifically explained and illustrated without departing from its spirit or scope.

What is claimed is:

1. A one piece cover for a clutch assembly having a release sleeve movable between first and second positions, the cover comprising:
   a main body portion which is generally annular in shape;
   an engagement spring seat formed on said main body portion adapted to receive a spring thereon for urging the release sleeve toward the first position; and
   an assister spring seat formed integrally on said main body portion adapted to receive a spring thereon for urging the release sleeve toward the second position.

2. The invention defined in claim 1 wherein said engagement spring seat includes a seat portion formed integrally with said main body portion and extending radially inwardly therefrom.

3. The invention defined in claim 2 wherein said seat portion terminates in an inwardly facing surface, at least a portion of which has a generally V-shaped cross section.

4. The invention defined in claim 3 wherein said engagement spring seat further includes at least one ear portion formed integrally with said seat portion.

5. The invention defined in claim 4 wherein a pair of spaced apart ear portions are formed integrally with said seat portion.

6. The invention defined in claim 1 wherein said assister spring seat includes an arm portion formed integrally with said main body portion and extending radially inwardly therefrom.

7. The invention defined in claim 6 wherein said arm portion terminates in an inwardly facing surface, at least a portion of which has a generally V-shaped cross section.

8. The invention defined in claim 7 wherein said assister spring seat further includes at least one button portion formed integrally with said arm portion.

9. A one piece release sleeve for a clutch assembly having a cover, the release sleeve being movable between first and second positions, comprising:
   an end portion which is generally annular in shape;
   an engagement spring seat formed on said end portion adapted to receive a spring thereon for urging the release sleeve toward the first position; and
   an assister spring seat formed integrally on said end portion adapted to receive a spring thereon for urging the release sleeve toward the second position.

10. The invention defined in claim 9 wherein said engagement spring seat includes a seat portion formed integrally with said end portion and extending radially outwardly therefrom.

11. The invention defined in claim 10 wherein said seat portion terminates in an outwardly facing surface, at least a portion of which has a generally V-shaped cross section.

12. The invention defined in claim 11 wherein said engagement spring seat further includes at least one ear portion formed integrally with said seat portion.

13. The invention defined in claim 12 wherein a pair of spaced apart ear portions are formed integrally with said seat portion.

14. The invention defined in claim 9 wherein said assister spring seat includes an arm portion formed integrally with said end portion and extending radially outwardly therefrom.

15. The invention defined in claim 14 wherein said arm portion terminates in an outwardly facing surface, at least a portion of which has a generally V-shaped cross section.

16. The invention defined in claim 15 wherein said assister spring seat further includes at least one button portion formed integrally with said arm portion.

* * * * *